June 8, 1926.
H. D. BALL ET AL
1,587,627
SIGNAL FOR VEHICLES
Filed Oct. 2, 1922    3 Sheets-Sheet 1
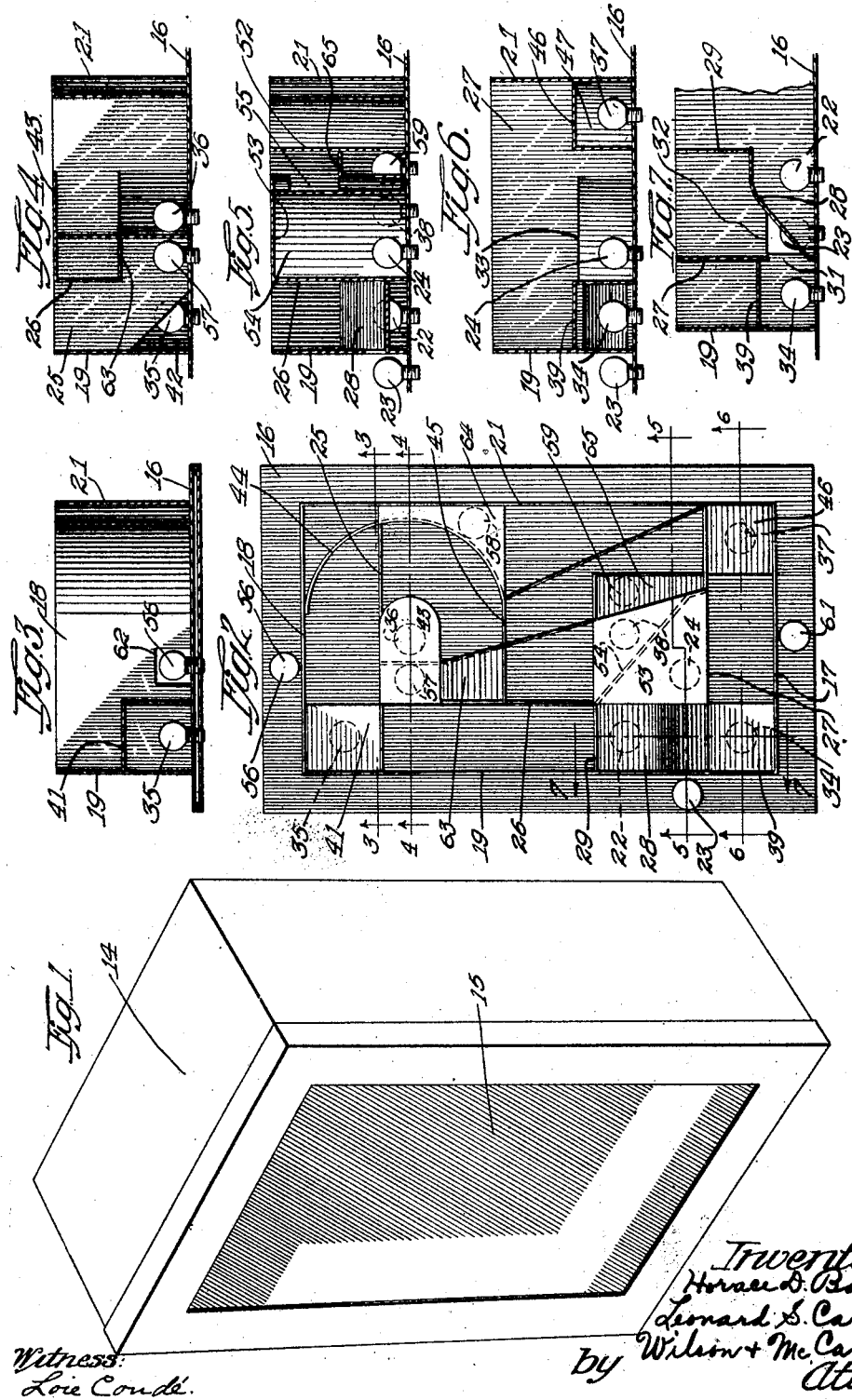

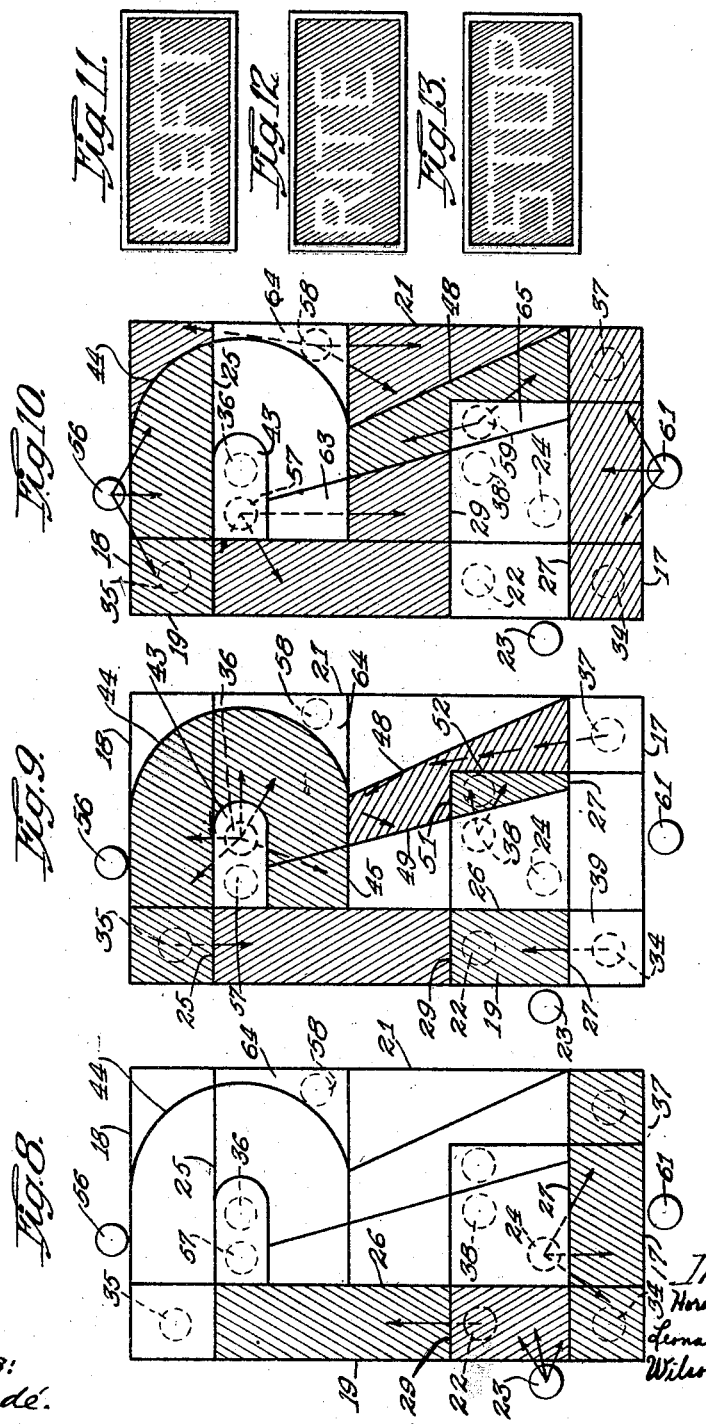

June 8, 1926.
H. D. BALL ET AL
1,587,627
SIGNAL FOR VEHICLES
Filed Oct. 2, 1922    3 Sheets-Sheet 3
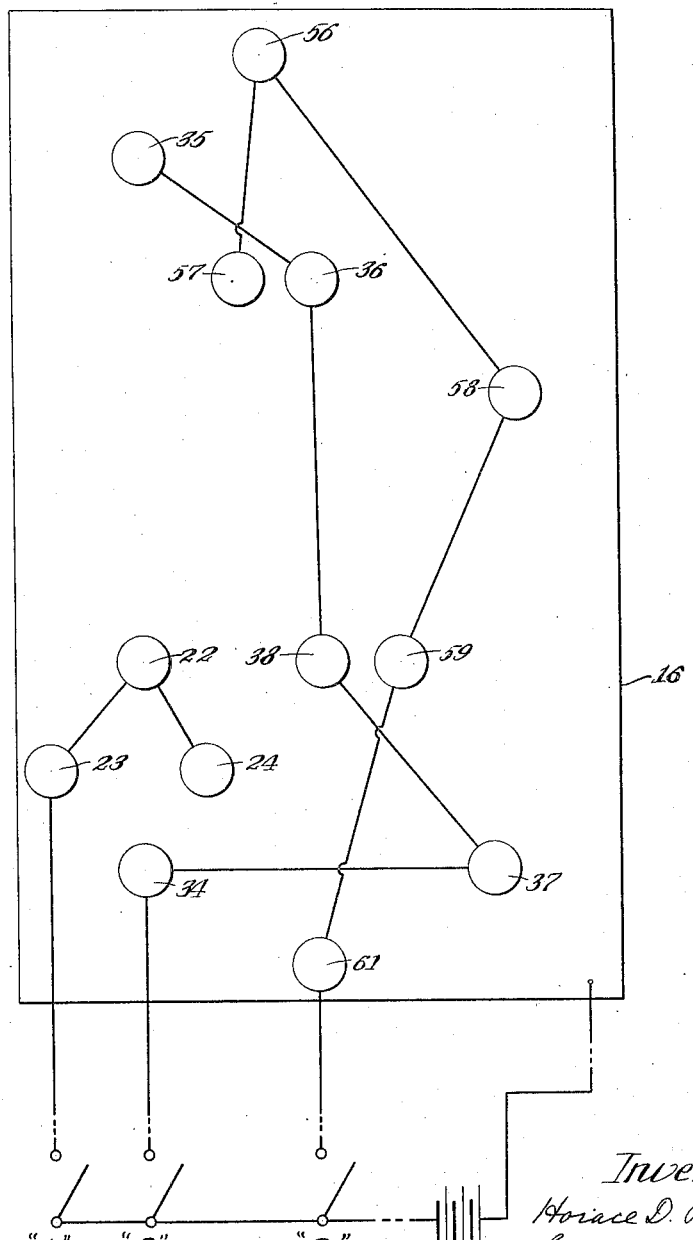

Patented June 8, 1926.

1,587,627

UNITED STATES PATENT OFFICE.

HORACE D. BALL AND LEONARD S. CARR, OF BELOIT, WISCONSIN.

SIGNAL FOR VEHICLES.

Application filed October 2, 1922. Serial No. 591,724.

This invention pertains to indicators or signalling devices adapted to be mounted on an automobile or other vehicle, and the purpose of which is to convey or indicate to the driver of a following car, an intention to change direction or reduce speed.

One of the purposes of this invention is to provide a device of the character indicated which will be entirely devoid of moving parts, thus obviating to a very large degree any possibility of the device getting out of order.

Another feature of the invention resides in the fact that without moving parts the device is capable of indicating through a single observation glass of relatively small size, the intention of the driver to turn to the right, or to the left, or to stop.

A further purpose of the invention is to provide a device which will be extremely simple and compact in structure and arrangement, one which can be economically manufactured and readily installed, and which will be light in weight, while at the same time, possess sufficient strength and rigidity to insure reliability and durability.

Other objects and advantages of the invention should be readily apparent as the same becomes better understood by reference to the following description when considered in connection with the accompanying drawings.

Referring to the drawings,

Figure 1 is a perspective view of an indicator embodying our invention;

Fig. 2 is a front elevation with the front frame work and covering glass removed;

Figs. 3 to 7 inclusive, are sectional views on lines 3—3, 4—4, 5—5, 6—6 and 7—7, respectively, of Fig. 2;

Figs. 8, 9 and 10 are diagrammatic views showing respectively, the lights of the letters L, R and S;

Figs. 11, 12 and 13 are views showing the application of our invention as applied respectively, to the words Left, Rite and Stop, and Fig. 14, is a wiring diagram used with the present embodiment of our invention.

In furtherance of the above mentioned objects, our invention contemplates the provision of a composite arrangement of partitions and electric light bulbs for the purpose of illuminating through a single observation glass, the letters L, R and S or any other letters for signal purposes; and also a duplication of the principles employed in displaying such letters for the purpose of signaling a series of words, such as Left, Rite and Stop. We have accordingly for purpose of illustration shown a single working embodiment taking the letters L, R and S as an example.

Referring more particularly to the drawings, it will be noted that our improvements are housed in a box-like casing designated generally by 14, which has a glass front 15, preferably of red stained glass, on which the signal is to be displayed.

There is removably supported in a vertical position within and at the rear of said casing a socket or conductor plate 16. Upon this plate is mounted a number of forwardly reaching partitions, and a number of electric light bulbs so arranged as to produce illuminations on the glass 15 in the form of the letters L, R and S. For purpose of clarity, the illumination of these letters will be described in the order named.

Said partitions are bounded by lower and upper walls 17 and 18 respectively, and side walls 19 and 21 which reach from the glass 15 to the socket plate 16 and are fixed to the latter. The letter L shown diagrammatically by the section lines in Fig. 8 and illuminated by the lights 22, 23 and 24, is defined by the bottom wall 17, the major portion of the side wall 19, the left hand portion of a horizontal wall 25, a vertical wall 26, a horizontal wall 27, and the lower portion of the vertical side wall 21. The light 22 is disposed beneath a partition 28, which as shown in Fig. 2, reaches from the side wall 19 to the wall 26, and as shown in Fig. 7 terminates at its upper end in a horizontal wall 29, and inclines downwardly and rearwardly so as to join the socket plate 16 at the rear of an opening 31 in the horizontal wall 27. The light 22, therefore, is adapted to illuminate only that portion defined by the walls 19, 25, 26 and 29. The rays from the light 23 project through an opening 32 in the wall 19 and illuminate that portion defined by the walls 19, 29, 26 and 27 above the partition 28. The lower portion of the letter L defined by the walls 17, 19, 27 and 21 is illuminated by the light 24, the rays of which are directed through an opening 33, (Fig. 6) in the manner illustrated by the arrows in Fig. 8. It will be apparent that when the light bulbs 22, 23 and 24 are lighted, the letter L will be displayed on the glass 15 in the manner illustrated by the section lines in Fig. 8, and as shown in the glass 15 in Fig. 1.

The letter R shown in Fig. 9, will be illuminated by the light bulbs 34 to 38 inclusive. The light 34 is disposed beneath a casing 39 closed except for the opening 31 above mentioned, through which the rays are directed upwardly into that portion defined by the walls 19, 29, 26 and 27. The light 35 disposed beneath a casing 41 closed except for the opening 42 (Fig. 4) in the wall 25, illuminates through said opening that portion defined by the walls 19, 25, 26 and 29. The light 36 positioned beneath a front profile portion 43, illuminates the top and curved part of the letter R defined by the curved wall 44, the horizontal wall 45, said profile portion 43 and the portions of the walls 26, 19 and 18 as illustrated by the arrows in Fig. 9. The light 37 is positioned beneath a casing 46 closed except for the opening 47 in its top, through which opening the rays are directed upwardly illuminating the short leg of the letter R defined by the walls 27, 48, 45 and 49. A portion of this leg, however, defined by the walls 49, 51 and 52, is illuminated by the light 38, which is disposed beneath a front profile plate 53 and so restricted by the wall 29 and an inclined wall 54 that its rays illuminate only through the opening 55. (Fig. 5) for illuminating said section of the leg.

For illuminating the letter S, the lights 56 to 61 inclusive, are employed. The rays from the light 56 reach downwardly through the opening 62 in the top wall 18 and illuminate that portion of the S defined by the walls 18, 19, 25 and a portion of the curved wall 44. The light 57 positioned beneath the profile portion 43 and beneath an intermediate profile wall 63, illuminates the portion bounded by the walls 19, 29 and 49, the profile wall 63 and a portion of the wall 26, as plainly indicated by the arrows emanating from said light, as shown in Fig. 10. The light 58 positioned beneath the front profile plate 64 directs the rays upwardly into the portion between the curved wall 44 and the walls 18 and 21 and downwardly into the portion between the walls 21 and 48. The light 59 positioned beneath a profile wall 65 disposed beneath the opening 55 as shown in Fig. 5, and conforming to the outline of the walls 49, 51 and 52, illuminates that portion of the letter S bounded by the walls or portions thereof numbered 49, 45, 48, 27, 52 and 51. The lower bar of the letter S is illuminated by the light 61, the rays of which are directed through an opening in the bottom wall 17 similarly to illumination through the opening 62 above described.

By connecting each group of lights, namely, the group 22 to 24 inclusive, for the letter L, 34 to 38 inclusive for the letter R, and 56 to 61 inclusive for the letter S, in parallel, the respective letters may be individually illuminated. In the present instance, the plate 16 constitutes a socket or conductor plate, and therefore one of the terminals of the circuit, although this construction is not essential, and any suitable or preferred mounting of the light bulbs or arrangement of the wiring may be employed. In Fig. 14 we have shown a diagram illustrating the present wiring, in which it will be observed that a separate switch is employed designated by "L" "R" and "S" for closing each letter circuit, this being desirable in the use of our invention for a traffic signal on motor vehicles. By reason of the construction disclosed herein it will be noted that none of the light bulbs are directly exposed in the body of the letters. Instead, each letter is illuminated by rays from hidden bulbs with the result that a more uniform illumination is obtained for each letter. It will be evident that each letter is illuminated by a separate group of light bulbs, although some portions of the lettering are common to two or more of the letters. As a result, composite letters are obtained, each of which is clearly defined on the observation glass and is of substantially maximum proportions considering the dimensions of the glass.

Our invention also contemplates employing the principles above disclosed for displaying any of a series of words such as Left, Rite and Stop as distinguished from the letters L, R and S. In this application of our invention, the letters L, R and S, are obtained in the same manner as described above in detail. The remaining composite letters may be obtained by duplication of the principles disclosed with reference to the construction and arrangement of the partitions and lights.

It is believed that the foregoing conveys a clear understanding of the objects prefaced above, and while we have illustrated but a single working embodiment it should be understood that considerable change might be made in details of construction without departing from the spirit and scope of the invention as expressed in the appended claims, in which—

We claim:

1. A signal indicator of the character described, comprising side partition walls and front profile walls designed to jointly define composite letters, and electric light bulbs for illuminating the letters separately, said bulbs being located beneath certain profile walls so as not to be exposed to view from the front during the illuminating of any letter but to illuminate it by lateral projection of the light rays.

2. A display device comprising, in combination, a casing having an observation glass at its front, a supporting plate at its back provided with electric light sockets, side partition walls and front profile portions between said plate and glass jointly defining composite letters, and electric light bulbs for said sockets, said sockets being located beneath said profile portions and the casing for illuminating the letters without being directly exposed.

3. A display device comprising, in combination, side partition walls and front profile portions jointly providing composite letters, a casing therefor having a display opening exposing only said letters, the casing providing a marginal enclosure, and electric light bulbs located beneath said profile portions and within said marginal enclosure for illuminating the letters without being directly exposed.

4. A display device comprising, in combination, side partition walls and front profile portions jointly providing composite letters and means for illuminating said letters separately including electric light bulbs certain of which are located between said side partition walls, and reflector walls positioned in front of certain of said bulbs located between the partition walls for obstructing the light rays from certain portions of the letters.

5. A display device comprising, in combination, side partition walls, front profile portions and intermediate wall portions jointly providing composite letters, and electric light bulbs for illuminating said letters, certain of which bulbs are located beneath said profile portions and intermediate wall portions.

HORACE D. BALL.
LEONARD S. CARR.